(12) United States Patent
Nojek et al.

(10) Patent No.: US 9,132,703 B2
(45) Date of Patent: Sep. 15, 2015

(54) PNEUMATIC VEHICLE TIRE WITH SPECIFIED BRACING PLIES AND BRACING BANDAGE

(75) Inventors: Rafal Nojek, Hannover (DE); Viktor Bluemel, Hannover (DE)

(73) Assignee: CONTINENTAL REIFEN DEUTSCHLAND GMBH, Hannover (DE)

( * ) Notice: Subject to any disclaimer, the term of this patent is extended or adjusted under 35 U.S.C. 154(b) by 133 days.

(21) Appl. No.: 13/541,225

(22) Filed: Jul. 3, 2012

(65) Prior Publication Data

US 2012/0267027 A1 Oct. 25, 2012

Related U.S. Application Data

(63) Continuation of application No. PCT/EP2010/065376, filed on Oct. 14, 2010.

(30) Foreign Application Priority Data

Jan. 7, 2010 (DE) .......................... 10 2010 000 014

(51) Int. Cl.
| | |
|---|---|
| *B60C 17/00* | (2006.01) |
| *B60C 9/22* | (2006.01) |
| *B60C 9/20* | (2006.01) |
| *B60C 19/12* | (2006.01) |

(52) U.S. Cl.
CPC ............. *B60C 19/122* (2013.04); *B60C 9/2009* (2013.04); *B60C 9/22* (2013.01); *B60C 17/0009* (2013.04); *B60C 19/12* (2013.01); *B60C 2009/2048* (2013.04); *B60C 2009/2051* (2013.04); *B60C 2009/2233* (2013.04); *Y10T 152/1081* (2015.01); *Y10T 152/10765* (2015.01)

(58) Field of Classification Search
CPC  B60C 9/2009; B60C 9/22; B60C 2009/2051; B60C 2009/17; B60C 2009/0009; B60C 19/12; B60C 9/2204; B60C 2009/2048; B60C 17/0009; Y10T 152/10765; Y10T 152/10783
USPC .................. 152/531, 533, 527, 526, 517, 502
See application file for complete search history.

(56) References Cited

U.S. PATENT DOCUMENTS

| | | | |
|---|---|---|---|
| 6,082,423 A | 7/2000 | Roesgen et al. | |
| 6,098,393 A | 8/2000 | Han | |
| 6,247,514 B1 | 6/2001 | Kim et al. | |
| 6,257,291 B1 | 7/2001 | Boiocchi et al. | |
| 6,581,662 B2 * | 6/2003 | Yukawa et al. | ................ 152/527 |
| 7,168,470 B2 * | 1/2007 | Yukawa et al. | ................ 152/531 |
| 7,395,845 B2 * | 7/2008 | Yukawa | ........................ 152/526 |
| 2009/0020208 A1 * | 1/2009 | Fukumoto | |

FOREIGN PATENT DOCUMENTS

| | | |
|---|---|---|
| EP | 0 960 749 | 12/1999 |
| EP | 0 849 098 | 3/2003 |
| EP | 0 908 329 | 4/2003 |

OTHER PUBLICATIONS

Form PCT/ISA/210, Form PCT/ISA/220 and Form PCT/ISA/237 (28 pages) issued in PCT/EP2010/065376, Jan. 28, 2011.

* cited by examiner

*Primary Examiner* — Adrienne C Johnstone
(74) *Attorney, Agent, or Firm* — Greenblum & Bernstein, P.L.C.

(57) ABSTRACT

Pneumatic vehicle tire includes at least two bracing plies arranged to intersect each other at an angle and including reinforcements of steel arranged substantially parallel to and at a distance from one another and embedded in a rubber material. Bracing ply reinforcements are oriented at an angle of 18° to 45° with the circumferential direction of the tire. A bracing bandage is also included having at least one ply with reinforcements of a non-metallic material arranged substantially parallel to and at a distance from one another and generally extending a circumferential direction of the tire. Bracing bandage reinforcements include a material with heat shrinkage properties. Under a predetermined extension of 1% in the longitudinal direction of the reinforcements, each bracing ply, has a tension of <17,500 N per dm of width, and the bracing bandage as a whole has a tension of >2,000 N per dm of width.

16 Claims, No Drawings

PNEUMATIC VEHICLE TIRE WITH SPECIFIED BRACING PLIES AND BRACING BANDAGE

CROSS-REFERENCE TO RELATED APPLICATIONS

The present application is a Continuation of International Patent Application No. PCT/EP2010/065376 filed Oct. 14, 2010, and claims priority under 35 U.S.C. §§119 and 365 of German Patent Application No. 10 2010 000 014.0 filed Jan. 7, 2010. Moreover, the disclosures of International Patent Application No. PCT/EP2010/06537 and of German Patent Application No. 10 2010 000 014.0 are expressly incorporated by reference herein in their entireties.

BACKGROUND OF THE INVENTION

1. Field of the Invention

Embodiments of the invention relate to a pneumatic vehicle tire having two or more bracing plies intersecting at an angle and with steel reinforcements and also having a bracing bandage of one or more plies and with reinforcements.

2. Discussion of Background Information

Structures of pneumatic vehicle tires are sufficiently well-known to a person skilled in the art. Radial tires include a belt and often a bracing bandage.

The belt consisting of two or more bracing plies intersecting at an angle provides the stiffness of the tread in the longitudinal and transverse directions. This serves for force transmission during driving, improves the lateral guidance and reduces the abrasion of the tire. The bracing bandage, consisting of one or more circumferentially oriented plies, mainly serves for additionally absorbing forces in the circumferential direction, in order for example to limit the expansion of the tire caused by centrifugal forces during the operation of the tire. The bracing bandage may cover the belt, or else the bracing bandage as a whole or individual bandage plies may be located between or under the bracing plies.

It is known and customary at present to use steel cords as reinforcements in the bracing plies of the belt. The steel cords are arranged within the reinforcing ply substantially parallel to and at a distance from one another and are embedded in rubber material. Bracing plies fitted in passenger car tires often have steel cords of the structure 2×0.30 mm, for a setting of 80 epdm (ends per decimeter) or more. The cord structure 2×0.30 mm means that two wires (filaments) of 0.30 mm in diameter are twisted together to form one cord, so that the cord has a diameter of about 0.60 mm. The cords of this diameter are embedded in rubber to form plies. The greater the cord diameter, the more rubber is required for embedding the cords and the heavier each bracing ply is, and the heavier the tire. A prescribed bracing ply is constructed in such a way that, under a predetermined extension of 1%, it has a tension of greater than 17 500 N per decimeter (dm) of width. A disadvantage of bracing plies with the aforementioned steel cords is that they are comparatively heavy in terms of weight and expensive in terms of material.

It is likewise known and customary at present to use bracing bandages in combination with steel belts. Bracing bandages fitted in passenger car tires often have one or two plies of rubberized nylon cords of the structure 940×2 for 80 epdm. Such a bracing bandage is constructed in such a way that, under a predetermined extension of 1% in the direction of the longitudinal extent of the cord, a force of less than or equal to approximately 1500 N per dm of width builds up. Nylon is often used because this material has a heat shrinkage, that is to say it shrinks when heated. This is of advantage both during the vulcanization of the tire and during operation at high speed, because the bracing bandage then helps to hold the belt assembly together. Furthermore, this prevents the bracing bandage from undergoing compression during operation, which is disadvantageous for its fatigue strength and can lead to ruptures of the bandage material.

Efforts in tire development are constantly striving to achieve a low-cost tire of low weight, with which however the performance is maintained at a high level.

SUMMARY OF THE EMBODIMENTS

Embodiments of the invention are directed to a low-cost pneumatic vehicle tire of low weight which nevertheless has good performance.

Accordingly, each bracing ply has a tension of <17 500 N per dm of width under a predetermined extension of 1% in the direction of the longitudinal extent of the reinforcements, and the reinforcements of the bracing plies form an angle of 18° to 45° to the circumferential direction of the tire. The reinforcements of the bracing bandage are of a non-metallic material and have a heat shrinkage, and the bracing bandage as a whole has a tension of >2000 N per dm of width under a predetermined extension of 1%.

Embodiments of the invention are directed to a pneumatic vehicle tire that includes at least two bracing plies arranged to intersect each other at an angle and including reinforcements of steel arranged substantially parallel to and at a distance from one another and embedded in a rubber material. The reinforcements of the bracing plies are oriented at an angle of 18° to 45° with the circumferential direction of the tire. A bracing bandage is also included having at least one ply with reinforcements of a non-metallic material arranged substantially parallel to and at a distance from one another and generally extending a circumferential direction of the tire. The reinforcements of the bracing bandage include a material with heat shrinkage properties. Each bracing ply, under a predetermined extension of 1% in the direction of the longitudinal extent of the reinforcements, has a tension of <17,500 N per dm of width, and the bracing bandage as a whole, under a predetermined extension of 1%, has a tension of >2,000 N per dm of width.

According to embodiments, the reinforcements of the bracing ply can include steel cords from at least one of a high-tensile (HT) or an ultra-high-tensile (UHT) strength range. The cords of the bracing ply have a structure 2×0.175 and are arranged in each bracing ply with approximately 110 epdm.

In accordance with other embodiments of the present invention, the reinforcements of the bracing bandage comprise a material from one of the classes of polyester or nylon or hybrid structures of rayon, lyocell, PVA (polyvinyl alcohol), PEN (polyethylene naphthalate), POK (polyolefin ketone), Vectran (aromatic polyester) or aramid with polyester or nylon.

According to still other embodiments, the reinforcement of the bracing bandage may include a polyester cord having a structure 1440 dtex×2 for 105 epdm.

Further, the reinforcements of each bracing ply form an angle of 27° to 35° to the circumferential direction of the tire. The reinforcements of each bracing ply form an angle of approximately 28° to the circumferential direction of the tire.

According to still other embodiments, the bracing plies can be cut bracing plies.

Moreover, the pneumatic vehicle tire may be structured with runflat properties. The tire may also include cross-sectionally crescent-shaped reinforcing profiles arranged under a belt in a tire shoulder region and within side walls of the tire, and closed in an annular manner over a circumference of the sidewall.

According to further embodiments of the instant invention, the tire can also include a self-adhesive viscous sealing layer on a radial inside of a tire inner layer.

Embodiments of the invention are directed to a pneumatic vehicle tire that includes at least two bracing plies intersecting at an angle and having reinforcements that are arranged substantially parallel to and at a distance from one another and embedded in rubber material. The reinforcements of the bracing plies are oriented at an angle of 18° to 45° with the circumferential direction of the tire. The tire also includes a bracing bandage having at least one ply and having reinforcements oriented in a circumferential direction of the tire that are arranged substantially parallel to and at a distance from one another and embedded in rubber material. The reinforcements of the bracing bandage include a material with heat shrinkage properties. Each bracing ply, under a predetermined extension of 1% in the direction of the longitudinal extent of the reinforcements, has a tension of <17,500 N per dm of width, and the bracing bandage as a whole, under a predetermined extension of 1%, has a tension of >2,000 N per dm of width.

According to embodiments, the reinforcements of the bracing ply may include steel cords from at least one of a high-tensile (HT) or an ultra-high-tensile (UHT) strength range. The cords of the bracing ply have a structure 2×0.175 and are arranged in each bracing ply with approximately 110 epdm.

In accordance with other embodiments, the reinforcements of the bracing bandage can include a non-metallic material that includes at least one of polyester, nylon, hybrid structures of rayon, lyocell, PVA, PEN, POK, Vectran or aramid with polyester or nylon.

Further, the reinforcement of the bracing bandage comprises a polyester cord having a structure 1440×2 for 105 epdm.

Embodiments of the instant invention are directed to a method of forming a pneumatic vehicle tire. The method includes arranging at least two bracing plies to intersect at an angle, the bracing plies having reinforcements that are arranged substantially parallel to and at a distance from one another and embedded in rubber material, such that the reinforcements of the bracing plies are oriented at an angle of 18° to 45° with the circumferential direction of the tire. The method includes positioning a bracing bandage having at least one ply over the at least two bracing plies, the bracing bandage having reinforcements oriented in a circumferential direction of the tire that are arranged substantially parallel to and at a distance from one another and embedded in rubber material, such that the reinforcements of the bracing bandage include a material with heat shrinkage properties. Each bracing ply, under a predetermined extension of 1% in the direction of the longitudinal extent of the reinforcements, has a tension of <17,500 N per dm of width, and the bracing bandage as a whole, under a predetermined extension of 1%, has a tension of >2,000 N per dm of width.

According to embodiments, the method can also include forming a run-flat tire structure.

The method can also include positioning cross-sectionally crescent-shaped reinforcing profiles arranged under a belt in a tire shoulder region and within side walls of the tire, and which is closed in an annular manner over a circumference of the sidewall.

In accordance with still yet other embodiments of the present invention, the method can also include providing a self-adhesive viscous sealing layer on a radial inside of an inner layer.

Other exemplary embodiments and advantages of the present invention may be ascertained by reviewing the present disclosure and the accompanying drawing.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The embodiments of the invention utilize reinforcements with reduced weight in the bracing plies, the reduced modulus of which is compensated by the comparatively high buildup of force under extension of the bracing bandage. The cost saving and weight saving can be achieved, e.g., by reducing the number of reinforcements used per dm or by reducing the diameter of the reinforcements used. The reinforcements of the bracing plies may include filaments twisted to form cords, each filament having a diameter of, e.g., less than 0.24 mm and the setting being less than or equal to 80 epdm, or may include individual wires of a diameter less than 0.30 mm.

High performance is achieved, since a suitable dynamic ground contact area is obtained during operation of the tire. The use of reinforcements with a reduced diameter in the bracing plies advantageously has the effect of reducing the weight of the pneumatic vehicle tire. The tire according to the invention is of low cost, has an improved rolling resistance on account of its reduced weight and, moreover, has improved suitability for high speeds.

It is advantageous if the reinforcements of the bracing ply are cords from the high-tensile (HT) or ultra-high-tensile (UHT) strength range. The reinforcements of the high-tensile range have, depending on the filament diameter, a rupture strength of approximately 3000 MPa to 3500 MPa, while corresponding reinforcements of the ultra-high-tensile range have a strength that is about 500 MPa higher.

The reinforcements of the bracing bandage are preferably materials from the classes of polyester or nylon. Hybrid structures of rayon, lyocell, PVA, PEN, POK, Vectran or aramid with polyester or nylon may likewise be used. However, in accordance with embodiments of the invention, at least one material of the bracing bandage reinforcements exhibits heat shrinking properties.

Moreover, in embodiments, it is preferable that the structures of the reinforcements of the bracing plies and of the bandage match one another, in order to obtain a suitable dynamic ground contact area during the operation of the tire. The bracing bandage may be wound and have a continuous wound pattern, in such a way that the effective cord density is reduced.

Since the tire according to the invention is reduced in weight, it is suitable for use in comparatively heavy runflat tires, such as in a Self-Supporting Runflat (SSR) tire or a tire with a self-adhesive viscous sealing layer arranged on the radial inside of the tire inner layer.

The "extra weight" of these runflat tires may advantageously be compensated by the prescribed lower weight bracing ply and bandage structure. As SSR tires are tires with reinforcing profiles in the tire sidewalls, the tire remains self-supporting over a certain distance even if it is deflated. Tires with a sealing layer located between the shoulders on the inner layer of the tire under the tread rubber, are distinguished by the fact that, when a foreign body penetrates the tread of the pneumatic vehicle tire, it is enclosed by the sealing layer and a possible loss of air is prevented by a seal being formed almost immediately.

A pneumatic vehicle tire according to the invention in its most general form has two or more bracing plies intersecting at an angle and having reinforcements and also a bracing bandage of one or more plies and having reinforcements. The reinforcements of the bracing plies and of the bracing bandage are arranged substantially parallel to and at a distance from one another and are embedded in rubber material. Each bracing ply, under a predetermined extension of 1% in the direction of the longitudinal extent of the reinforcements, has a tension of <17 500 N per dm of width, and the reinforcements of the bracing plies are oriented to form an angle of 18° to 45° to the circumferential direction of the tire. Further, the reinforcements of the bracing bandage are arranged within the reinforcing ply approximately in the circumferential direction of the tire and are formed from or include a material that has a heat shrinkage. The bracing bandage as a whole, under a predetermined extension of 1%, has a tension of >2000 N per dm of width.

In a preferred example, embodiments of the invention can be incorporated in a passenger car tire of tire size 225/45 R 17, and the exemplary car tire can include a 2-ply belt of HT steel cords of the structure 2×0.175 for approximately 80 epdm. The HT steel cords are oriented to form an angle of 28° to the circumferential direction of the tire. Further, a 1-ply bandage covering the bracing plies includes cords of polyester arranged approximately in the circumferential direction of the tire and a structure of 1440×2 for approximately 105 epdm. Under a predetermined extension of 1% in the direction of the longitudinal extent of the reinforcements, each bracing ply has a tension of approximately 8700 N per dm of width and, under a predetermined extension of 1%, the bracing bandage has a tension of approximately 2000 N per dm of width. During the operation of the passenger car tire, a suitable dynamic ground contact area is obtained.

The pneumatic vehicle tire according to the invention may be a passenger car, van or light-truck tire.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A pneumatic vehicle tire comprising:
   at least two bracing plies arranged to intersect each other at an angle and including reinforcements of steel arranged parallel to and at a distance from one another and embedded in a rubber material;
   the reinforcements of the bracing plies being oriented at an angle of 18° to 45° with the circumferential direction of the tire;
   a bracing bandage having at least one ply with reinforcements of a non-metallic material arranged parallel to and at a distance from one another and extending a circumferential direction of the tire; and
   the reinforcements of the bracing bandage include a material with a heat shrinkage,
   wherein each bracing ply, under a predetermined extension of 1% in the direction of the longitudinal extent of the reinforcements, has a tension of <9,000 N per dm of width, and the bracing bandage as a whole, under a predetermined extension of 1%, has a tension of >2,000 N per dm of width.

2. The pneumatic vehicle tire according to claim 1, wherein the reinforcements of the bracing ply comprise steel cords from at least one of a high-tensile (HT) or an ultra-high-tensile (UHT) strength range.

3. The pneumatic vehicle tire according to claim 2, wherein the cords of the bracing ply have a structure 2×0.175 mm and are arranged in each bracing ply with 100 epdm.

4. The pneumatic vehicle tire according to claim 1, wherein the reinforcements of the bracing bandage comprise a material from one of the classes of polyester or nylon or hybrid structures of rayon, lyocell, polyvinyl alcohol (PVA), polyethylene naphthalate (PEN), polyolefin ketone (POK), Vectran aromatic polyester or aramid with polyester or nylon.

5. The pneumatic vehicle tire according to claim 1, wherein the reinforcement of each bracing bandage comprises a polyester cord having a structure 1440 dtex×2 and is arranged with 105 epdm.

6. The pneumatic vehicle tire according to claim 1, wherein the reinforcements of each bracing ply form an angle of 27° to 35° to the circumferential direction of the tire.

7. The pneumatic vehicle tire according to claim 6, wherein the reinforcements of each bracing ply form an angle of 28° to the circumferential direction of the tire.

8. The pneumatic vehicle tire according to claim 1, wherein the bracing plies are cut bracing plies.

9. The pneumatic vehicle tire according to claim 1 being structured with runflat properties.

10. The pneumatic vehicle tire according to claim 8, further comprising cross-sectionally crescent-shaped reinforcing profiles arranged under a belt in a tire shoulder region and within side walls of the tire, and closed in an annular manner over a circumference of the sidewall.

11. The pneumatic vehicle tire according to claim 1, further comprising a self-adhesive viscous sealing layer on a radial inside of a tire inner layer.

12. A pneumatic vehicle tire comprising:
    at least two bracing plies arranged to intersect each other at an angle and including reinforcements of steel arranged parallel to and at a distance from one another and embedded in a rubber material;
    the reinforcements of the bracing plies being oriented at an angle of 18° to 45° with the circumferential direction of the tire;
    a bracing bandage having at least one ply with reinforcements of a non-metallic material arranged parallel to and at a distance from one another and extending a circumferential direction of the tire; and the reinforcements of the bracing bandage include a material with a heat shrinkage, wherein each bracing ply, under a predetermined extension of 1% in the direction of the longitudinal extent of the reinforcements, has a tension of 8,700 N per dm of width, and the bracing bandage as a whole, under a predetermined extension of 1%, has a tension of >2,000 N per dm of width.

13. A method of forming a pneumatic vehicle tire comprising:

arranging at least two bracing plies to intersect at an angle, the bracing plies having steel reinforcements that are arranged parallel to and at a distance from one another and embedded in rubber material;

the reinforcements of the bracing plies being oriented at an angle of 18° to 45° with the circumferential direction of the tire;

positioning a bracing bandage having at least one ply over the at least two bracing plies, the bracing bandage having non-metallic reinforcements oriented in a circumferential direction of the tire that are arranged parallel to and at a distance from one another and embedded in rubber material; and the reinforcements of the bracing bandage include a material with a heat shrinkage, wherein each bracing ply, under a predetermined extension of 1% in the direction of the longitudinal extent of the reinforcements, has a tension of <9,000 N per dm of width, and the bracing bandage as a whole, under a predetermined extension of 1%, has a tension of >2,000 N per dm of width.

14. The method according to claim 13, further comprising forming a run-flat tire structure.

15. The method according to claim 13, further comprising positioning cross-sectionally crescent-shaped reinforcing profiles arranged under a belt in a tire shoulder region and within side walls of the tire, and which is closed in an annular manner over a circumference of the sidewall.

16. The method according to claim 13, further comprising providing a self-adhesive viscous sealing layer on a radial inside of an inner layer.

* * * * *